US00RE45696E

(19) United States
(12) Reissued Patent
Yoshida et al.

(10) Patent Number: US RE45,696 E
(45) Date of Reissued Patent: Sep. 29, 2015

(54) INFORMATION PROCESSING APPARATUS AND INFORMATION PROCESSING METHOD

(75) Inventors: Asami Yoshida, Kanagawa (JP); Takuya Iwamoto, Saitama (JP)

(73) Assignee: SONY CORPORATION, Tokyo (JP)

(21) Appl. No.: 13/299,163

(22) Filed: Nov. 17, 2011

Related U.S. Patent Documents

Reissue of:
(64) Patent No.: 7,627,505
Issued: Dec. 1, 2009
Appl. No.: 10/325,940
Filed: Dec. 23, 2002

(30) Foreign Application Priority Data

Dec. 28, 2001 (JP) ..... 2001-400172

(51) Int. Cl.
*G06Q 99/00* (2006.01)
*G06Q 20/40* (2012.01)
*G06Q 40/00* (2012.01)

(52) U.S. Cl.
CPC ..... *G06Q 20/401* (2013.01); *G06Q 40/00* (2013.01)

(58) Field of Classification Search
USPC ..... 705/50, 44, 34, 39, 40, 35, 64, 67; 379/145; 709/224; 713/169; 455/41.2
See application file for complete search history.

(56) References Cited

U.S. PATENT DOCUMENTS 5,835,896 A * 11/1998 Fisher et al. ..... 705/37
5,845,265 A * 12/1998 Woolston ..... 705/37
5,870,723 A * 2/1999 Pare et al. ..... 705/39
5,930,777 A * 7/1999 Barber ..... 705/40
6,064,990 A * 5/2000 Goldsmith ..... 705/75
6,076,078 A * 6/2000 Camp et al. ..... 705/65
6,094,643 A * 7/2000 Anderson et al. ..... 705/44
6,202,051 B1 * 3/2001 Woolston ..... 705/26.3
6,236,981 B1 * 5/2001 Hill ..... 705/67
6,243,691 B1 * 6/2001 Fisher et al. ..... 705/37
6,260,024 B1 * 7/2001 Shkedy ..... 705/37
6,321,339 B1 * 11/2001 French et al. ..... 726/2
6,327,578 B1 * 12/2001 Linehan ..... 705/65
6,330,546 B1 * 12/2001 Gopinathan et al. ..... 705/35
6,334,121 B1 * 12/2001 Primeaux et al. ..... 706/62
6,516,056 B1 * 2/2003 Justice et al. ..... 379/145
6,618,756 B1 * 9/2003 Katsurabayashi ..... 709/224

(Continued)

FOREIGN PATENT DOCUMENTS

JP 7-131527 5/1995
JP 11-259585 9/1999

(Continued)

*Primary Examiner* — James D Nigh
(74) *Attorney, Agent, or Firm* — Oblon, McClelland, Maier & Neustadt, L.L.P.

(57) ABSTRACT

An activity-area/time-frame weighting table indicates the likelihood of where a user is most likely to be in a certain time frame, and weighting (the number of points) is set depending on times frames, which are divided into weekdays and weekends. The activity pattern may be obtained through the user's application at the time of registration, or may be obtained by detecting the locations of the user for a predetermined period, such as for one week, using a GPS or PHS. For example, when a user is mostly likely to be on the route to the company from home in the time frame of commuting hours on a weekday, the weighting is set low. Based on an area and time frame in which a corresponding credit card or the like is used, the number of points is determined, and is then used to set an authentication level.

10 Claims, 12 Drawing Sheets

(56) References Cited

U.S. PATENT DOCUMENTS

| | | | | |
|---|---|---|---|---|
| 6,782,476 | B1 * | 8/2004 | Ishibashi | 713/169 |
| 6,938,019 | B1 * | 8/2005 | Uzo | 705/65 |
| 6,999,722 | B2 * | 2/2006 | Iwasaki | 455/41.2 |
| 7,177,838 | B1 * | 2/2007 | Ling | 705/41 |
| 7,305,691 | B2 * | 12/2007 | Cristofalo | 725/34 |
| 7,451,114 | B1 * | 11/2008 | Matsuda et al. | 705/39 |
| 7,603,411 | B1 * | 10/2009 | Davies et al. | 709/204 |
| 8,126,960 | B2 * | 2/2012 | Obradovich et al. | 709/203 |
| 2001/0054003 | A1 * | 12/2001 | Chien et al. | 705/14 |
| 2002/0013815 | A1 * | 1/2002 | Obradovich et al. | 709/204 |
| 2003/0013459 | A1 * | 1/2003 | Rankin et al. | 455/456 |
| 2003/0105960 | A1 * | 6/2003 | Takatori et al. | 713/168 |
| 2005/0154676 | A1 * | 7/2005 | Ronning et al. | 705/44 |

FOREIGN PATENT DOCUMENTS

| | | |
|---|---|---|
| JP | 2000-090366 | 3/2000 |
| JP | 2000-099603 | 4/2000 |
| JP | 2000-116636 | 4/2000 |
| JP | 2000-194747 | 7/2000 |
| JP | 2001-236585 | 8/2001 |

* cited by examiner

FIG. 3

| CLIENT ID | ADDRESS (AREA) | MAIN ITEM CATEGORY |
|---|---|---|
| 0001 | ΔΔ STATE ××CITY OOO | FOOD PRODUCT |
| 0002 | ΔΔ STATE ××CITY OOO | FOOD PRODUCT |
| 0003 | OO STATE OOCITY ××× | MISCELLANEOUS GOODS |
| 0004 | ΔΔ STATE ΔΔCITY OOO | OTHERS |
| 0005 | OO STATE OO CITY ××× | CLOTHING |
| ... | ... | ... |

FIG. 4

| USER ID | WEIGHTING TABLE ID | | | CONTACT INFORMATION |
|---|---|---|---|---|
| | ACTIVITY AREA/ TIME FRAME | ITEM CATEGORY | PURCHASE AMOUNT | |
| U0001 | E0001 | C0001 | M0001 | XXXXXX |
| U0002 | E0002 | C0002 | M0002 | XXXXXX |
| U0003 | E0003 | C0003 | M0003 | XXXXXX |
| U0004 | E0004 | C0004 | M0004 | XXXXXX |
| ... | ... | ... | ... | ... |

FIG. 5

| | TIME FRAME \ AREA | ROUTE 1 | ROUTE 2 | ROUTE 3 | AVE 1 | AVE 2 | AVE 3 | AVE 4 | TOWN A | TOWN B | COM-PANY | PARK | PARENTS' HOME | HOME |
|---|---|---|---|---|---|---|---|---|---|---|---|---|---|---|
| WEEKDAY EVENT | COMMUTING HOUR I 8:00-9:30 | 3 | 3 | 2 | 3 | 2 | 7 | 7 | 3 | 2 | 2 | 8 | 8 | 3 |
| | BUSINESS HOUR 9:30-17:00 | 10 | 10 | 10 | 10 | 10 | 10 | 10 | 10 | 10 | 5 | 10 | 10 | 8 |
| | COMMUTING HOUR II 17:00-22:00 | 1 | 1 | 1 | 1 | 1 | 5 | 5 | 1 | 1 | 1 | 10 | 8 | 1 |
| | HOME 22:00-8:00 | 10 | 10 | 10 | 10 | 10 | 10 | 10 | 10 | 10 | 10 | 10 | 10 | 10 |
| WEEKEND EVENT | 10:00-22:00 | 1 | 7 | 8 | 1 | 8 | 1 | 1 | 1 | 8 | 10 | 1 | 1 | 1 |
| | 22:00-10:00 | 10 | 10 | 10 | 10 | 10 | 10 | 10 | 10 | 10 | 10 | 10 | 10 | 10 |

FIG. 7

| CATEGORY | POINTS |
|---|---|
| MISCELLANEOUS GOODS | 1 |
| CLOTHING | 1 |
| FOOD PRODUCT | 2 |
| CD | 2 |
| DINING | 5 |
| CASHING SERVICE | 8 |
| OTHERS | 5 |

FIG. 8

| AMOUNT ($) | POINTS |
|---|---|
| 0 ~ 10 | 1 |
| 10 ~ 30 | 2 |
| 30 ~ 50 | 3 |
| 50 ~ 100 | 4 |
| 100 ~ 300 | 5 |
| 300 ~ 1,000 | 8 |
| MORE | 10 |

FIG. 9

| AUTHENTICATION LEVEL | DETERMINATION CRITERION |
|---|---|
| A | 1 ~ 9 |
| B | 10 ~ 15 |
| C | 16 ~ 25 |
| D | 26 ~ 40 |
| E | 41 ~ |

FIG. 10

| DATA AND TIME | USER ID | CLIENT ID | AUTHENTICATION LEVEL | AUTHENTICATION RESULT |
|---|---|---|---|---|
| 01.05.18 20:30 | U 2809 | 0038 | A | OK |
| 01.05.19 10:01 | U 8877 | 0125 | B | OK |
| 01.05.19 10:30 | U 3869 | 0333 | B | OK |
| 01.05.19 10:30 | U 1208 | 0098 | D | OK |
| 01.05.19 10:31 | U 3647 | 0277 | A | OK |
| 01.05.19 10:36 | U 0502 | 0008 | C | OK |
| ⋮ | ⋮ | ⋮ | ⋮ | ⋮ |

FIG. 13A

| AUTHENTICATION LEVEL | AUTHENTICATION SCHEME |
|---|---|
| A | SIGNATURE |
| B | SIGNATURE + PASSWORD |
| C | SIGNATURE + FINGERPRINT |
| D | SIGNATURE + PASSWORD + FINGERPRINT + IRIS |

FIG. 13B

| AUTHENTICATION LEVEL | AUTHENTICATION SCHEME |
|---|---|
| A | PASSWORD |
| B | PASSWORD + FINGERPRINT |
| C | PASSWORD + VOICEPRINT |
| D | SIGNATURE + FINGERPRINT + VOICEPRINT |

FIG. 13C

| AUTHENTICATION LEVEL | AUTHENTICATION SCHEME |
|---|---|
| A | SIGNATURE + PASSWORD |
| B | SIGNATURE + FINGERPRINT |
| C | SIGNATURE + FINGERPRINT + PALMPRINT |
| D | SIGNATURE + FINGERPRINT + FACE INFORMATION + VOICEPRINT |

FIG. 13D

| AUTHENTICATION LEVEL | AUTHENTICATION SCHEME |
|---|---|
| A | SIGNATURE |
| B | CHALLENGE RESPONSE + SIGNATURE |
| C | CHALLENGE RESPONSE + FINGERPRINT |
| D | CHALLENGE RESPONSE + FINGERPRINT + PALMPRINT |

INFORMATION PROCESSING APPARATUS AND INFORMATION PROCESSING METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 7,627,505. The reissue applications are: "INFORMATION PROCESSING APPARATUS AND INFORMATION PROCESSING METHOD," Ser. No. 14/048,927, filed on Oct. 8, 2013; and "INFORMATION PROCESSING APPARATUS AND INFORMATION PROCESSING METHOD," Ser. No. 14/676,590, filed on Apr. 1, 2015, all of which are continuation reissues of "INFORMATION PROCESSING APPARATUS AND INFORMATION PROCESSING METHOD," Ser. No. 13/299,163, filed on Nov. 17, 2011 as a broadening reissue of U.S. Pat. No. 7,627,505.*

BACKGROUND OF THE INVENTION

1. Field of the Invention

The present invention relates to information processing apparatuses and information processing methods, and more specifically to an information processing apparatus, which is preferably used for performing an authentication process using a plurality of authentication process methods, and an information processing method.

2. Description of the Related Art

Conventionally, as a method for user authentication, for example, when a cash card or credit card is used, a signature, password, or the like has often been required.

The signature, however, can be easily counterfeited, and the password can also be easily entered even by another person once the password is compromised, which thereby permits another person who impersonates the authentic user to use the cash card or credit card.

To prevent such impersonation, for example, a technique for performing an authentication process utilizing biometric information such as a fingerprint has been making progress. The biometric information is certainly more secured, i.e., more difficult to counterfeit, than a signature or password.

Even by an authentication process using biometric information, some incidents have been reported that image data was collected from a fingerprint left on glass or the like and a counterfeit finger was created and was authenticated by a commercially-available fingerprint verification device. In this manner, authentication using a single piece of information cannot be said to completely prevent impersonation.

Thus, a plurality of pieces of authentication information is further used to perform user authentication in some cases. However, such a need for an authentication process with a plurality of pieces of information causes considerable inconvenience to both a user and a store that executes an authentication process, especially when the user is making a very inexpensive purchase or when the user is shopping at a store to which he or she frequently goes. Thus, such an authentication could impair the convenience of the use of a cash card or credit card. In particular, an authentication process using biometric information often involves a complicated process such as image processing, so that an authentication process executed with a plurality of pieces of information requires a tremendous amount of processing time.

SUMMARY OF THE INVENTION

The present invention has been made in view of the foregoing situations, and an object of the present invention is to allow for an authentication process that is secured enough to prevent impersonation while minimizing an unnecessary authentication process by determining a user's authentication level prior to the authentication process.

A first information processing apparatus according to the present invention includes first recording means for recording information concerning an activity pattern of a registered user, first obtaining means for obtaining information concerning a location at which a shopping user undergoes an authentication process, second obtaining means for obtaining the current time, and authentication-level determining means. The authentication-level determining means determines an authentication level for the authentication process to be executed for the shopping user, based on the information concerning the registered user's activity pattern recorded in the first recording means, the information concerning the location obtained by the first obtaining means, and the current time obtained by the second obtaining means.

The information concerning the activity pattern can be recorded as a table in the first recording means, and weighting factors are preferably specified in the table so as to correspond to locations and time frames. Based on one of the weighting factors which corresponds to the information concerning the location obtained by the first obtaining means and the current time obtained by the second obtaining means, the authentication-level determining means can determine the authentication level for the authentication process to be executed for the shopping user.

The information processing apparatus may further include updating means for updating the activity pattern recorded in the first recording means.

The information processing apparatus can further include third obtaining means for obtaining information concerning an item to be purchased or a service to be used by the shopping user and second recording means for recording a table. The table is used for determining a predetermined weighting factor so as to correspond to the information concerning the item or the service. The authentication-level determining means can further use the information concerning the item or the service obtained by the third obtaining means and the weighting factor that is determined according to the table recorded by the second recording means, to determine the authentication level.

The information concerning the item or the service can include the information of an amount of money to be spent by the shopping user.

The information concerning the item or the service can include category information of the item or the service.

The information processing apparatus can further include transmitting means for transmitting information concerning the authentication level determined by the authentication-level determining means to another information processing apparatus.

A first information processing method according to the present invention includes a recording control step of controlling the recording of information concerning an activity pattern of a registered user, a first obtaining control step of controlling the obtaining of information concerning a location at which a shopping user undergoes an authentication process, a second obtaining control step of controlling the obtaining of the current time, and an authentication-level determining step of determining an authentication level for the authentication process to be executed for the shopping user. The authentication level is determined based on the information concerning the registered user's activity pattern that is recorded under the control of the recording control step, the information concerning the location that is obtained under the control of the first obtaining control step, and the current time that is obtained under the control of the second obtaining control step.

A second information processing apparatus according to the present invention includes first transmitting means for transmitting, to an authentication center, predetermined information necessary for determining an authentication level for an authentication process to be executed for a shopping user; first receiving means for receiving authentication level information from the authentication center; and determining means for determining a combination of a plurality of authentication process methods for the authentication process, based on the authentication level information received by the first receiving means.

The information processing apparatus can further include recording means for recording a table. The table is for determining the authentication process to be executed so as to correspond to the authentication level. The determining means determines a combination of the plurality of authentication process methods for the authentication process such that the authentication level information received by the first receiving means corresponds to the table recorded by the recording means.

The predetermined information transmitted from the first transmitting means can include an identification for identifying a location at which the authentication process is to be executed.

The predetermined information transmitted from the first transmitting means can include the information of an amount of money to be spent by the shopping user.

The predetermined information transmitted from the first transmitting means can include category information of an item to be purchased or a service to be used by the shopping user.

A second information processing method according to the present invention includes a first transmitting step of transmitting, to an authentication center, predetermined information necessary for determining an authentication level for an authentication process to be executed for a shopping user; a step of receiving authentication level information from the authentication center; and a step of using a combination of a plurality of authentication process methods, based on the authentication level information received by the receiving step.

Third information processing apparatus and method according to the present invention use a plurality of authentication process methods. An authentication process is performed using a combination of the authentication processing methods which is determined based on either time or a location at which an authentication process is to be performed or based on both the time and the location.

Fourth information processing apparatus and method according to the present invention use a plurality of authentication process methods. An authentication process is performed using a combination of the authentication process methods which is determined based on an item to be purchased through the authentication process or an amount of money for the item or based on both the item and the amount of money.

According to the first information processing apparatus and method, information concerning the activity pattern of a registered user is recorded, information concerning a location at which a shopping user undergoes an authentication process, and the current time is obtained, and an authentication level for an authentication process to be executed for the shopping user is determined based on the information concerning the activity pattern of the registered user, the information concerning the location, and the current time. Thus, when a rightful user undergoes an authentication process in the range of his or her ordinary life, it is possible to prevent an authentication process from being executed at an authentication accuracy more than required and thus to prevent more time from being taken than required in an accounting process upon purchase of goods or services, based on the activity pattern of the registered user and on a location and time at which a shopping user undergoes an authentication process. Furthermore, it is possible to determine an authentication level for an authentication process that is secured enough to prevent impersonation by a third party.

According to the second information processing apparatus and method, a predetermined information necessary for determining an authentication level for an authentication process to be executed for a shopping user is transmitted and authentication level information is received, and a combination of a plurality of processes for the authentication process is determined based on the received authentication level information. Thus, it is possible to prevent an authentication process from being executed at an authentication accuracy more than required and thus to prevent more time from being taken than required in an accounting process upon purchase of goods or services, based on the obtained authentication level, when a rightful user undergoes an authentication process in the range of his or her ordinary life. Furthermore, it is possible to perform an authentication process that is secured enough to prevent impersonation by a third party.

BRIEF DESCRIPTION OF THE DRAWINGS

FIG. 3 illustrates an exemplary store-information table;

FIG. 4 illustrates an exemplary personal-information table;

FIG. 5 illustrates an exemplary activity-area/time-frame weighting table;

FIG. 7 illustrates an exemplary item-category weighting table;

FIG. 8 illustrates an exemplary purchase-amount weighting table;

FIG. 9 illustrates an exemplary authentication-level determination table;

FIG. 10 illustrates an exemplary authentication-log table;

FIGS. 13A to 13D illustrate how a combination of personal authentication devices are determined depending on authentication levels.

DESCRIPTION OF THE PREFERRED EMBODIMENTS

Figure 1:
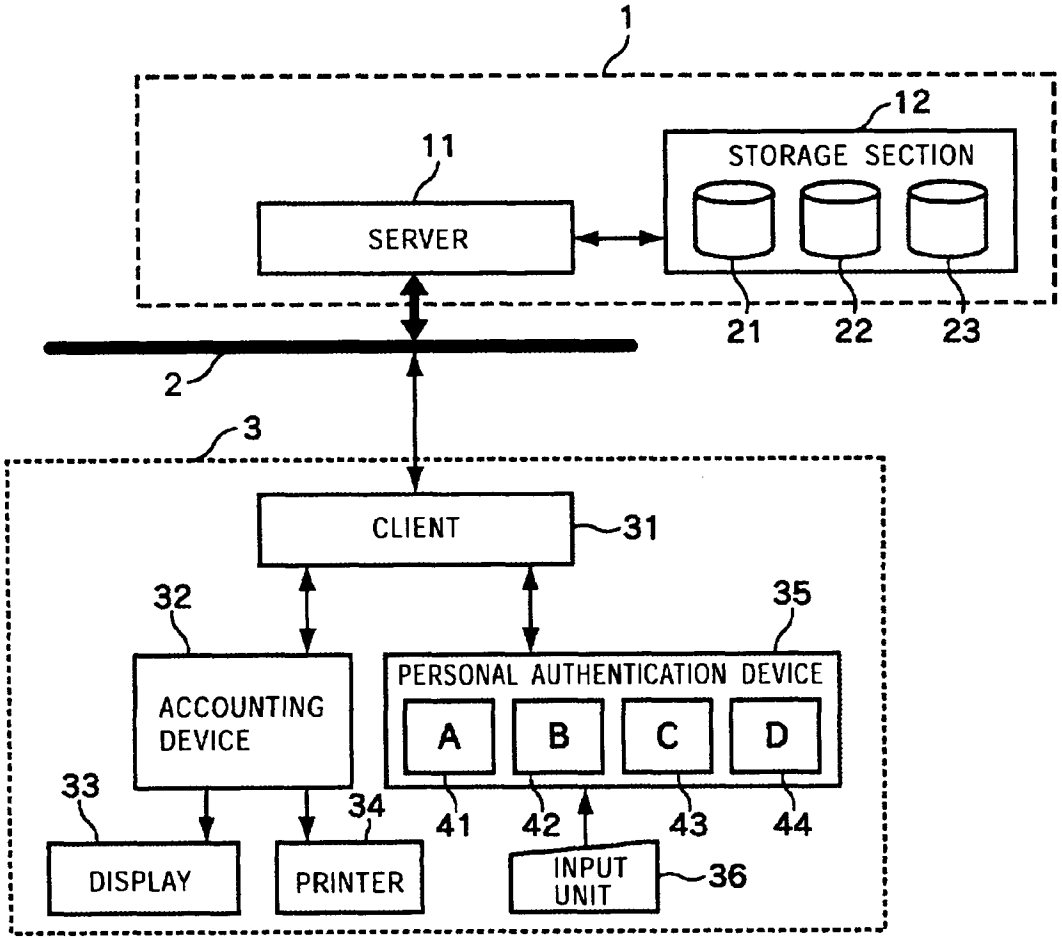
FIG. 1 is a diagram illustrating an authentication center, a store, and a network connection in an authentication processing system according to the present invention.

The embodiment of the present invention will be described below with reference to the accompanying drawings.

A description will now be made of an authentication processing system according to the present invention with reference to FIG. 1.

A server 11 at an authentication center 1 is connected to a client 31 at a store 3 over a predetermined network 2, such as the Internet or a dedicated line. When the network 2 is a network widely open to the public, such as the Internet, the server 11 at the authentication center 1 and the client 31 at the store 3 communicate information by using, for example, an encryption technology, to ensure that a malicious third party cannot take a peek at the information.

When a user (hereinafter may be referred to as a "shopping user") at the store 3 purchases an item or a service using, for example, a credit card, a cash card, or an IC card in which electronic money is input, the client 31 communicates predetermined information with the server 11 to authenticate whether the shopping user at the store 3 is an authentic user who has been registered. A description will now be made of an authentication process when a credit card is used at the store 3.

In FIG. 1, although only one store 3 is illustrated, needless to say, a plurality of stores 3 may be provided, each store 3 being connected by a respective client 31 to the server 11 of the authentication center 1 over the network 2. Since the configurations of the clients 31 to input devices 36 which are provided at respective stores are essentially the same as those at the store 3 shown in FIG. 1, the illustrations and the descriptions thereof will be omitted.

At the authentication center 1, a storage section 12, which includes a plurality of storage devices, is externally connected to the server 11. The storage section 12 includes various databases, such as a store-information database 21 in which information concerning the store 3 is recorded, a personal-information database 22 in which an ID (identification) for a registered user and personal information used for an authentication process are recorded, and an authentication-information database 23 for storing a reference table for determining an authentication level and a history of an authentication process result. Examples of personal information recorded in the personal-information database 22 include a password; image information for verifying a signature or features extracted from the signature; image information for verifying a fingerprint, a palmprint, an iris, or a face, or features extracted from the image information; voice data for verifying a voiceprint or features extracted from the voice data; and other biometric information of the user.

The client 31 at the store 3 is connected to an accounting device 32 and a personal authentication device 35.

The accounting device 32 is a so-called register or the like, which executes various calculations, such as determination of a total amount, and addition of tax, a service charge, and the like, in response to input of prices of an item and/or a service purchased by a user. The accounting device 32 causes a display 33 to display the calculation result, and allows a printer 34 to print it on predetermined paper and to output the printed paper as a receipt. In addition, when the client 31 is not provided with a display unit or is not connected to a display device, the accounting device 32 receives a signal representing an authentication process result from the client 31 and displays the result on the display 33.

The personal authentication device 35 includes at least one device for processing personal authentication, and each of the at least one device outputs information concerning personal authentication to the client 31. In this case, the personal authentication device 35 is constituted by four devices, i.e., personal authentication devices 41 to 44; however, the number and type of devices may vary depending on the individual stores 3.

The personal authentication device 35 executes a personal authentication process, for example, verification of a signature; input of a password; verification of biometric information, such as verification of a fingerprint, verification of a palmprint, comparison of features of a face, verification of a voiceprint, or verification of an iris; or a challenge response.

The challenge response is one of the user authentication schemes using a one-time password (OTP). Upon receiving a request for authentication from the user side, the authentication-side system transmits a random number, called a "challenge code", to the shopping user. The shopping user uses the challenge code, a token, and a PIN (personal identification number) to generate a response code, and returns the response code to the system. When the response is valid, the system authenticates the shopping user. Since the challenge code is generated at random for each case, a response created therefor is also different for each case.

Thus, as the personal authentication devices 41 to 44, the personal authentication device 35 may include a device for receiving a user's password from an input device 36; and/or a device for receiving and processing, for example, an image of a user's fingerprint, palmprint, face, or pupil to determine the features, when a CCD (charge coupled device) camera is used as the input device 36. Further, the personal authentication device 35 may include a device for recording user's voice input from the input device 36 and for analyzing the voice print thereof; a device for performing a computation for the so-called "challenge response"; and/or a device having a button with which a clerk at the store 3 who has verified the signature of a user enters information representing the signature being verified. With this arrangement, the personal authentication device 35 generates data needed for the authentication process and outputs the data to the client 31.

A method other than the above-described method may be used for the personal authentication method. For example, authentication may be performed by asking a shopping user a question that is not so complicated but that can be known by only an authentic person, including personal information (a part of a telephone number or address) registered at the time of user registration, a birthplace, or a mother's maiden name, and by determining whether or not the user can correctly answer the question. In such a case, the personal authentication device 35 can include a device for receiving the answer input from the input device 36. In this case, the question and the answer therefor are recorded in the personal-information database 22 of the authentication center 1.

Figure 2:
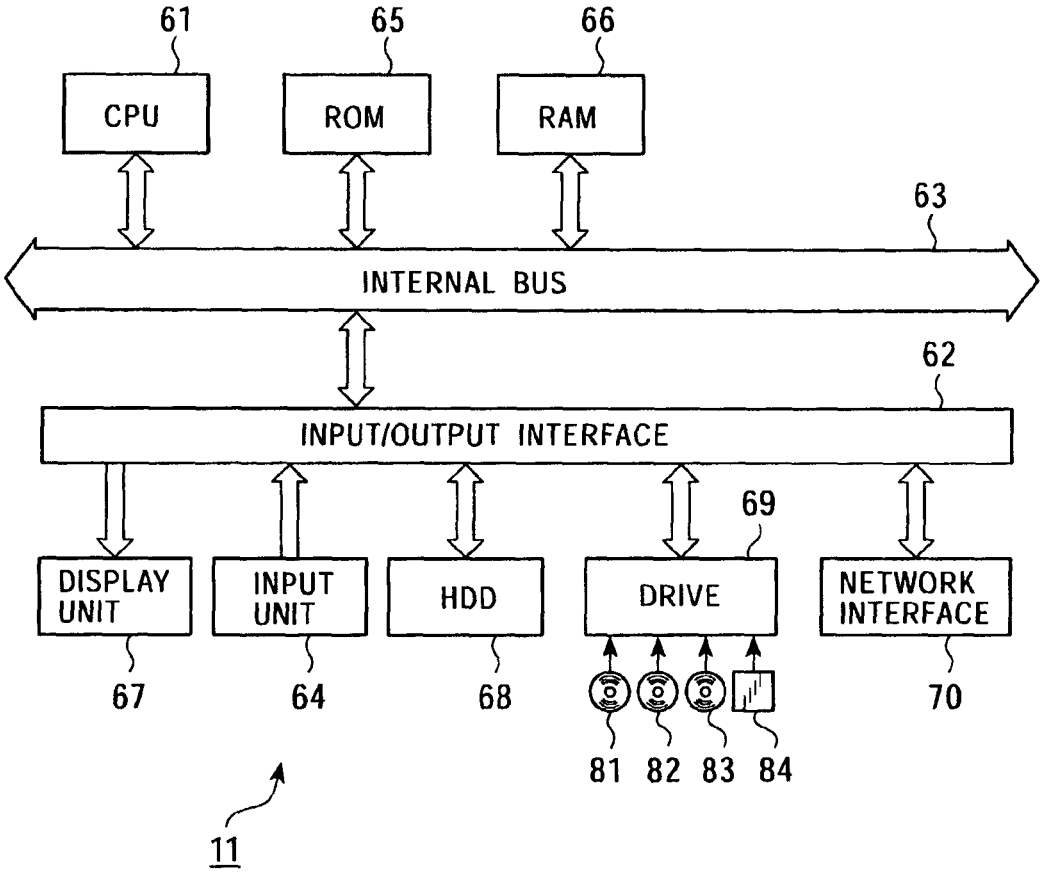
FIG. 2 is a block diagram illustrating the configuration of a server shown in FIG. 1.

FIG. 2 is a block diagram showing the configuration of the server 11.

Signals representing various instructions entered by the administrator of the server 11 using an input unit 64 and signals transmitted from the client 31 via a network interface 70 are input to a CPU (central processing unit) 61 through an input/output interface 62 and an internal bus 63. In accordance with such input signals, the CPU 61 executes various processes. A ROM (read only memory) 65 essentially stores constant data out of programs and computational parameters used by the CPU 61. A RAM (random access memory) 66 stores a program used and executed by the CPU 61 and parameters that vary as appropriate in response to the execution. The CPU 61, the ROM 65, and the RAM 66 are interconnected through the internal bus 63.

The internal bus 63 is also connected with the input/output interface 62. The input unit 64 is implemented with, for example, a keyboard, touchpad, jog dial and/or mouse, and is manipulated when the administrator of the server 11 enters various instructions to the CPU 61. A display unit 67 may be implemented with a CRT (cathode ray tube) display or an LCD (liquid crystal display) to display various kinds of information in the form of text, an image, or the like.

A HDD (hard disk drive) 68 drives a hard disk, and causes a program or information, which is executed by the CPU 61, to be recorded onto or played back from the hard disk. A magnetic disk 81, an optical disk 82, a magnetic optical disk 83, and a semiconductor memory 84 may be attached to a drive 69 as required for data recording and reading.

The network interface 70 is also connected to the network 2 and transmits and receives information to and from the client 31 over the network 2. Further, the network interface 70 is also connected to the storage section 12.

The input unit 64, the HDD 68, the drive 69, and the network interface 70 are connected to the CPU 61 through the input/output interface 62 and the internal bus 63.

A store-information table that is registered in the store-information database 21 in the storage section 12 will now be described with reference to FIG. 3.

Client IDs, which are individually assigned to the clients 31 provided at the stores 3, and address information (or, area information) indicating the locations of the stores 3 are registered in the store-information table. For each store 3, information such as a main item category and contact information (e.g., a telephone number and/or an electronic-mail address) may be registered in the store-information table.

A personal-information table that is registered in the personal-information database 22 in the storage section 12 will now be described with reference to FIG. 4.

Registered information in the personal-information table includes a user ID that is uniquely assigned to a registered user (a credit card holder), a weighting-table ID, and contact information (e.g., an address, telephone number, and electronic-mail address) of the user. The weighting-table ID is used for referring to a weighting table that is used for determining an authentication level when each user purchases an item or receives a service at the store 3 in which the user is registered.

The weighting table is created and updated based on the activity or use history of each user. The weighting table may be constituted by an activity-area/time-frame weighting table (which will be described below with reference to FIG. 5) in which the activity area and main activity time of a registered user are reflected; an item-category weighting table (which will be described later with reference to FIG. 7) in which the category of an item or service that the user often purchases or uses is reflected; and an purchase-amount weighting table (which will be described later with reference to FIG. 8), in which a price range that the user often uses is reflected, that is used for preventing extensive damage due to impersonation in the case of a large payment.

FIG. 5 shows an activity-area/time-frame weighting table that is registered in-the personal-information database 22 in the storage section 12.

The activity-area/time-frame weighting table is a table to which weighting factors (points) are applied according to the likelihood of a location at which a registered user of interest is most likely to be in a certain time frame. In the activity-area/time-frame weighting table of FIG. 5, time frames are divided into weekday events and weekend (holiday) events so that those events match the activity pattern of the user. The weighting factors for the activity area and the individual time frames may be obtained based on the user's application at the time of registration, or may be obtained based on data resulting from actual detection. In the latter case, for example, for a predetermined period such as for one week, a GPS (global positioning system) or PHS (personal handyphone system) can be utilized to detect where a user of interest is in respective time frames.

The GPS is a system for determining the location (longitude/latitude) and/or the traveling direction of a receiver by receiving radio waves from three satellites whose radio waves are the easiest to receive out of radio waves that are transmitted from geodetic earth orbiting satellites launched by the U.S. Department of Defense. When the GPS is utilized to determine and register the activity area of a user, the user moves with a GPS antenna for a predetermined period, for example, for one or two weeks. The current location of the user is then detected at every predetermined time, such as every 10 or 30 minutes, and the resulting data is accumulated and analyzed. This makes it possible to determine the likelihood of where the user is most likely to be in a certain time frame. Thus, the data can be advantageously reflected in the activity-area/time-frame weighting table.

Figure 6:
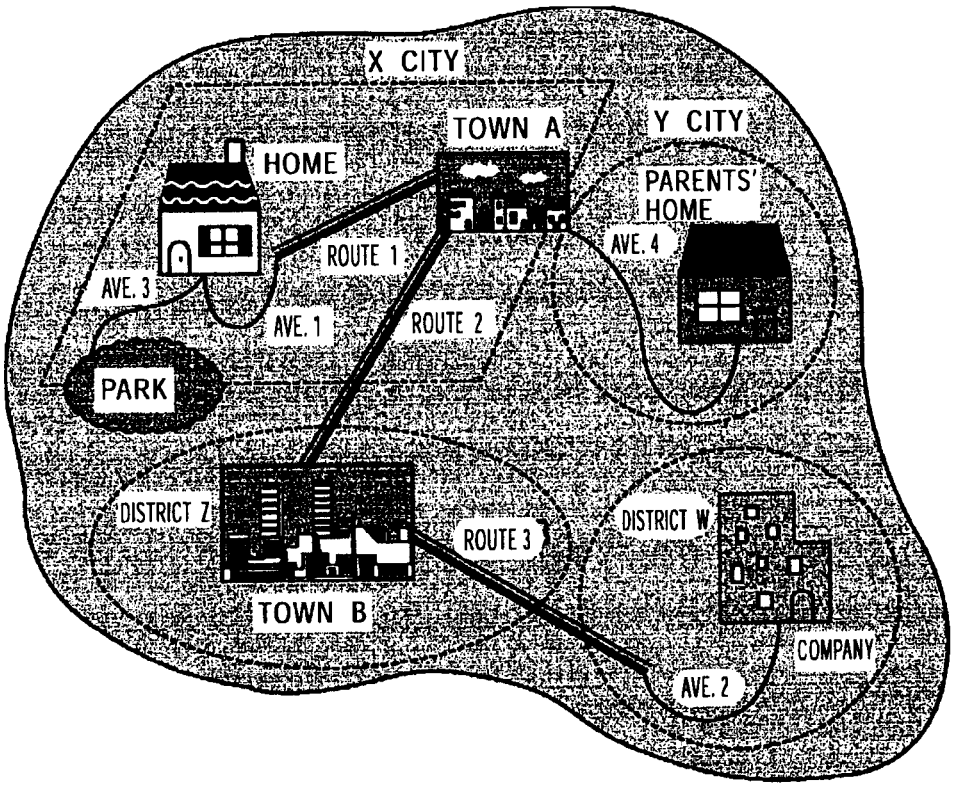
FIG. 6 illustrates an exemplary activity area of a user.

For example, a user is assumed to have a main personal-activity area shown in FIG. 6, which includes the user's home and its vicinity, town A in city X in which the home is located and a park, the parents' home of the user located in city Y and its vicinity, the user's company located in district W and its vicinity, town B in district Z located on the way to work, and traveling routes (e.g., routes 1 to 3 are railroads and avenues 1 to 4 are routes along which the user travels on foot or by bus) that connects those areas.

As shown in the activity-area/time-frame weighting table of FIG. 5, since this user is most likely to be on the route from home to the company in the time frame of commuting hours on weekdays, the weighting factors (points) for those corresponding areas are set to be low. Further, since the user is more likely to be shopping in the time frame on the way home rather than on the way to work, the points for the commuting routes and the towns on the way back home are set to be low. Also, in the time frame of business hours, since the user would most likely be at the company, corresponding points therefor are set to be low. However, since the user may occasionally be at home during that time frame, for example, when the user takes off from work due to poor physical condition, such a case is also taken into account to set the points. Meanwhile, in the time frame of business hours on weekdays, since the user would rarely be at a place other than the company and home, the points for such a case are set to be very high. Additionally, when the user is very unlikely to go out during the time frame of late-night hours or is least likely to be at the company or in an area toward the company during the daytime on a weekend, the points therefor are set to be very high.

In the activity-area/time-frame weighting table illustrated in FIG. 5, the weighting factors (points) are set with the numeric values of 1 to 10 according to locations (activity areas) and time frames for which an authentication process is to be performed. Naturally, the method for setting the points is not limited thereto. For example, the points may be set in more detail using numeric values 1 to 50 or the like, or may be set more roughly using 3-level numeric values.

In addition, while the user's activities are separately registered for the weekday events and weekend events in the activity-area/time-frame weighting table illustrated in FIG. 5, the classification of areas or time frames therein are not limited to what are illustrated in FIG. 5. For example, for a user who has a fixed day of the week on which the user does not work overtime or a set day of the week on which the user has a lesson after work, such a schedule may be considered to classify the areas or time frames in the activity-area/time-frame weighting table with every or a predetermined day of the week being differentiated.

A weighting factor (the number of points) associated with each area and time frame in the activity-area/time-frame weighting table is updated based on future records (i.e., the history of authentication processes) of the user's use of the credit card. For example, in a time frame and area for which the number of points is currently set high in the activity-area/time-frame weighting table, when a case in which a user is adequately authenticated using his or her credit card happens continuously more than a predetermined number of times, the weighting table is updated so that the number of points for the corresponding time frame and area becomes low.

In the above, while a case in which the weighting factors (points) are determined based on both locations (activity areas) and time frames have been described with reference to FIG. 5, such an approach is merely one example. Thus, the weighting factors (points) may be determined based on either locations (activity areas) or time frames.

An item-category weighting table that is registered in the personal-information database 22 in the storage section 12 will now be described with reference to FIG. 7.

Individual users purchase goods or services which suit their tastes, which vary to certain degrees in most cases. For example, a user may frequently purchase books, a user may prefer to collect miscellaneous goods, a user may not like eating out and thus often buy food products to cook his or her own meal, and a user may rarely listen to music and thus rarely buy CDs (compact disks).

Thus, such deviation of users' preferences can be utilized as information for determining whether or not a user is more likely to be an authentic user based on the category of an item or service to be purchased. Examples of item categories include general merchandise, clothing, food product, CD, dinning, cashing service, etc. Naturally, other categories, which are not listed in the item-category weighting table in FIG. 7, can also be prepared, including a book, medical service, use of a parking lot.

In cashing services, when a user uses, for example, an automated cash dispenser in some cases, the clerk or the like may not check the user's face. Such a case is more vulnerable to damage due to impersonation and can lead to a large amount of damage. Accordingly, with respect to cashing services, the weighting factors (points) may be set higher than those for other item categories regardless of the user's use frequency.

Points entered in the item-category weighting table may be designated by the user in advance at the time of registration, or may be set to the same value at the time of registration. Those points in the item-category weighting table are updated based on a future use history of the user.

A purchase-amount weighting table that is registered in the personal-information database 22 in the storage section 12 will now be described with reference to FIG. 8.

In the purchase-amount weighting table in FIG. 8, the weighting factors (points) are set higher as the amount of purchase is greater. This is because, in case that a malicious third party who impersonates the authentic user makes a large amount of purchase, the damage becomes correspondingly great.

With respect to the purchase-amount weighting table, the points may be set in the same manner as in the item-category weighting table illustrated in FIG. 7. Thus, the points may be set based on the frequency of price ranges that a user uses, or may be set by reflecting, to some extent, the frequency of individual price ranges that the user uses while setting points for a large amount of purchase to be high.

The server 11 receives a request for determining an authentication level from the client 31. Based on information transmitted from the client 31, the server 11 extracts the activity-area/time-frame weighting table in which the activity pattern of a user to be authenticated is set and recorded, the item-category weighting table, and the purchase-amount weighting table, and then extracts points from the respective tables. The server 11 then, for example, multiplies those points, to determine an authentication level based on the multiplied value.

FIG. 9 shows an authentication-level determination table that is registered in the authentication-level information database 23.

In this case, five authentication levels are provided ranging from levels A to E. Points that are extracted respectively from the activity-area/time-frame weighting table, the item-category weighting table, and the purchase-amount weighting table are multiplied, and when the resulting value of the multiplication is 1 to 9, the authentication level is A. Likewise, when the value is 10 to 15, the authentication level is B; when the value is 16 to 25, the authentication level is C; when the value is 26 to 40, the authentication level is D; and when the value is 41 or greater, the authentication level is E. Authentication level E is a level that does not permit an authentication process.

Although the authentication level has been described as being determined based on a value obtained by multiplying points that are respectively extracted from the activity-area/time-frame weighting table, the item-category weighting table, and the purchase-amount weighting table, any calculation method other than multiplication may be used to determine the authentication level. In addition, a weighting table other than the above-described three tables may be prepared to extract points. Alternatively, the number of points that is obtained from only the activity-area/time-frame weighting table may be used to determine the authentication level.

In addition, various variations are possible to determine the authentication level. For example, the authentication level can be determined based on either a location (activity area) or a time frame, based on both of them, based on either the category of an item or its price, or based on both of them.

An authentication-log table is also recorded in the authentication-level information database 23. The authentication-log table is used for storing the result of an authentication process, which is executed according to an authentication level determined using the authentication-level determination table. As shown in FIG. 10, in the authentication-log table recorded in the authentication-level information database 23, data and time at which an authentication process is executed, a user ID, a client ID, an authentication level, and an authentication result are registered.

Figure 11:
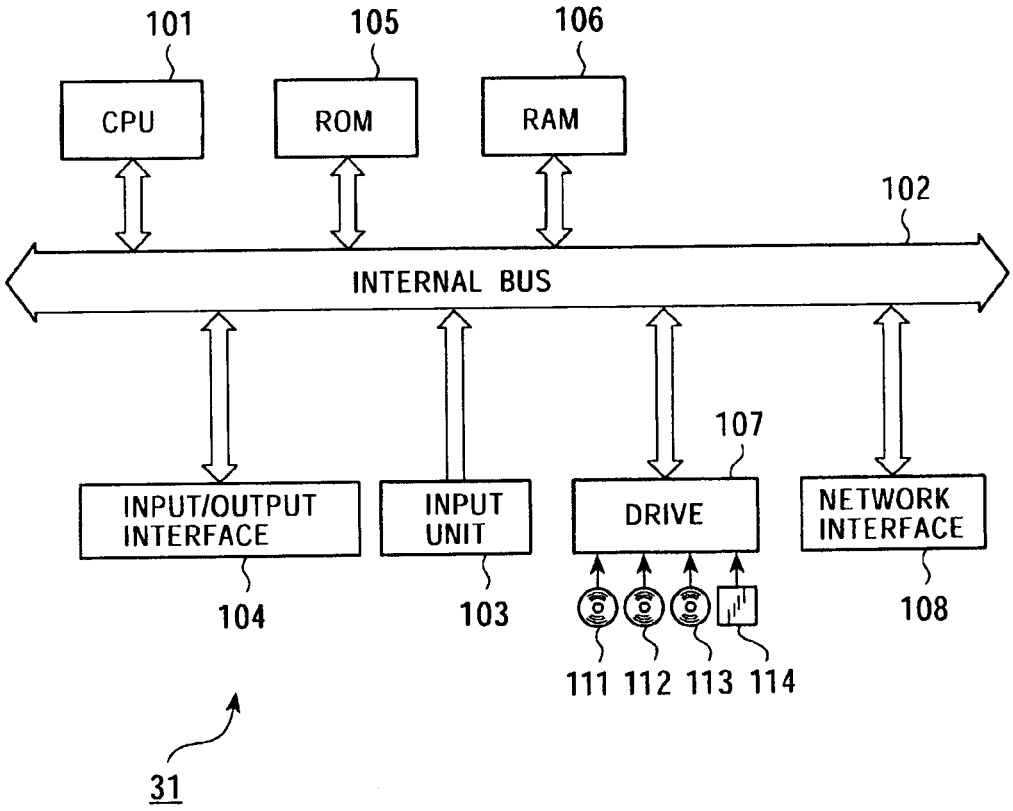
FIG. 11 is a block diagram illustrating a client shown in FIG. 1.

FIG. 11 is a block diagram showing the configuration of the client 31.

Signals representing various instructions entered by the clerk at the store 3 using an input device 103, signals transmitted from the server 11 via a network interface 108, and signals transmitted from the accounting device 32 or the personal authentication device 35 via an input/output interface 104 are input to a CPU 101. In accordance with such input signals, the CPU 101 executes various processes. A ROM 105 essentially stores, for example, a client ID, constant data out of programs and computational parameters used by the CPU 101. A RAM 106 stores a program used and executed by the CPU 101 and parameters that vary as appropriate in response to the execution. The CPU 101, the ROM 105, and the RAM 106 are interconnected through an internal bus 102.

The internal bus 102 is also connected to an input/output interface 104, an input unit 103, a drive 107, and a network interface 108. The input/output interface 104 is connected to the accounting device 32 and the personal authentication device 35, and transmits and receives information thereto and therefrom. The input unit 103 is implemented with, for example, a keyboard, touchpad, jog dial, and/or mouse, and is manipulated when the administrator of the client 31 enters various instructions into the CPU 101. A magnetic disk 111, an optical disk 112, a magnetic optical disk 113, or a semiconductor memory 114 may be attached to the drive 107 as required for data recording and reading.

The network interface 108 is also connected to the network 2 and transmits and receives information to and from the server 11 over the network 2.

Figure 12:
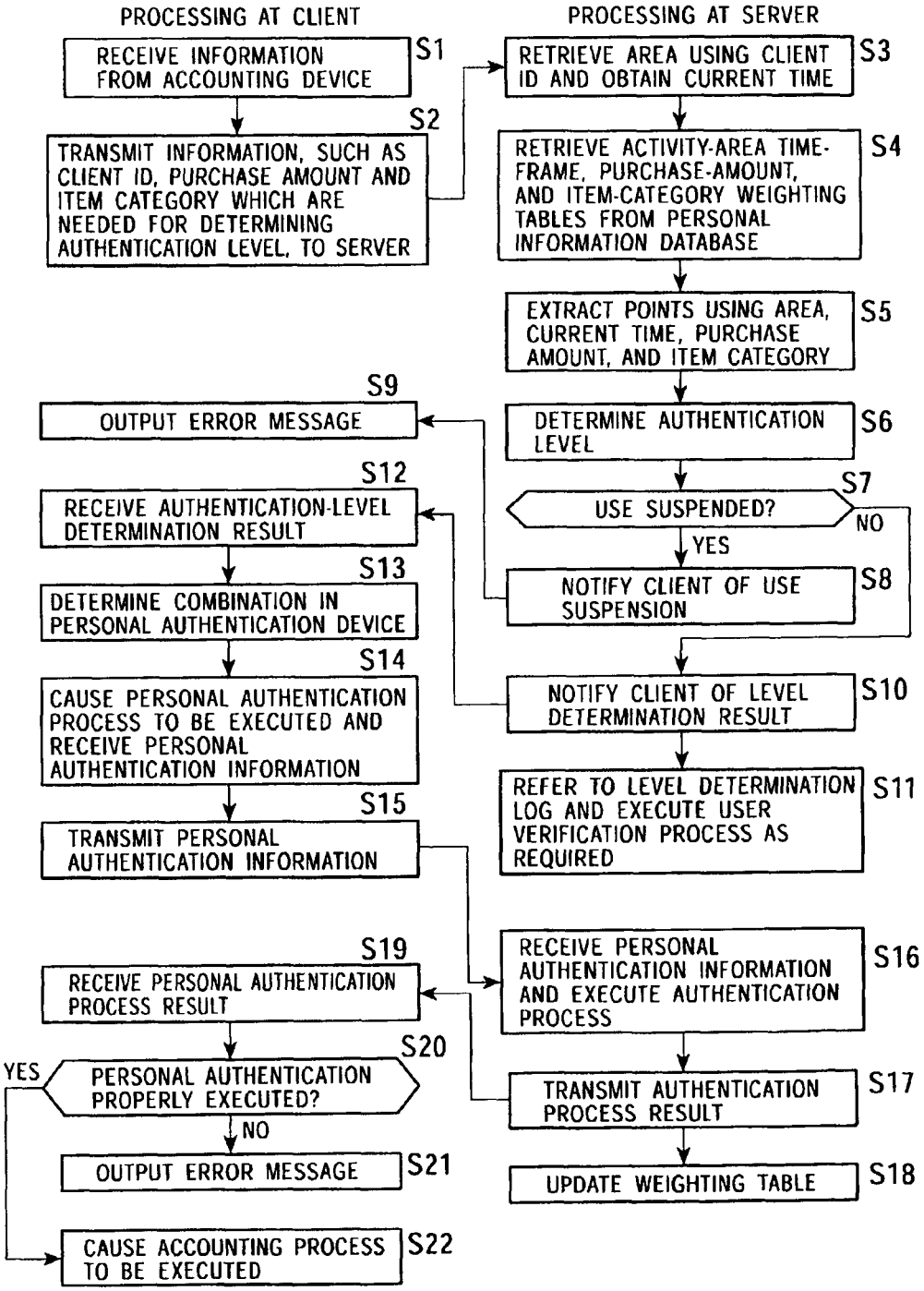
FIG. 12 is a flowchart illustrating processing at the client and server.

Processes executed by the server 11 and the client 31 will now be described with reference to a flow chart in FIG. 12.

In step S1, the CPU 101 of the client 31 receives information, such as the use of a credit card, the category of an item or service to be purchased, an amount therefor, and the like, from the accounting device 32 via the input/output interface 104 and the internal bus 102.

In step S2, the CPU 101 of the client 31 reads its own client ID from the ROM 105, and transmits the client ID to the server 11 via the internal bus 102, and the network interface 108, and the network 2 in conjunction with information (extracted from information input from the accounting device 32 and that is needed for determination of an authentication level), such as an amount and the category of an item to be purchased and the card number of a credit card to be used (a user ID or information that allows for identification of a user ID).

In step S3, based on the client ID, which is transmitted from the client 31 via the network 2, the network interface 70, the input/output interface 62, and the internal bus 63, the CPU 61 of the server 11 refers to the store-information table recorded in the store-information database 21 to retrieve the area of the store 3 and also to obtain the current time.

In step 4, based on a weighting table ID that is recorded in the personal information table recorded in the personal-information database 22, the CPU 61 of the server 11 retrieves, from the personal-information database 22, an activity-area/time-frame weighed table, a purchase-amount weighting table, and an item-category weighting table for a registered user who is the rightful owner of a credit-card that the user at the store 3 intends to use,.

In step S5, the CPU 61 of the server 11 refers to individual weighting tables, which are retrieved from the personal-information database 22, and extracts points according to the weighting tables, using information, such as the area of the client 31, the current time, and a purchase amount and item category which are included in the information transmitted from the client 31.

In step S6, the CPU 61 of the server 11 executes a predetermined computation, such as multiplying the points extracted in step S5, and determines an authentication level for an authentication process to be executed by the client 31, by referring to the authentication-level determination table stored in the authentication-information database 23.

For example, when the number of points in the activity-area/time-frame weighting table is 3, the number of points in the item-category weighting table is 2, and the number of points in the purchase-amount weighting table is 2, the multiplied value thereof is 12. Thus, the authentication level therefor is determined to be level B according to the authentication-level determination table in FIG. 9.

In step 7, based on the result determined in step S6, the CPU 61 of the server determines whether or not the authentication level is E, i.e., whether or not the credit card that the user at the store 3 intends to use is suspended, or to be suspended, from use.

In step S7, when it is determined that the credit card is suspended, or to be suspended, from use, in step S8, the CPU 61 of the server 11 generates a signal for notifying the client 31 of the suspension of use and transmits the signal to the client 31 via the internal bus 63, the input/output interface 62, the network interface 70, and the network 2.

In step 9, the CPU 101 of the client 31 receives the signal for notifying the suspension of use via the network 2, the network interface 108, and the internal bus 102, and then outputs an error message to the display 33 via the internal bus 102, the input/output interface 104, and the accounting device 32, so that the clerk at the store 3 is notified that the credit card the user at the store 3 intends to use is suspended from use (i.e., the user is most likely to be a non-registered user), thereby ending the process.

In step S7, when it is determined that the credit card is not suspended from use, in step S10, the CPU 61 of the server 11 transmits the result of the level determined in step S6 to the client 31 via the internal bus 63, the input/output interface 62, the network interface 70, and the network 2.

In step S11, the CPU 61 of the server 11 refers to a corresponding user's level determination log, which is recorded in the authentication-log table in the authentication-information database 23, and executes a user verification process as required when a high authentication level continues for a predetermined number of times or more with respect to the corresponding user.

The term "user verification process" herein means a process of confirming directly with a corresponding registered user that a credit card in question is not fraudulently used by a third party, based on the contact information of the registered user recorded in the persona-authentication table illustrated in FIG. 4. Such confirmation can be made in such a manner that, the CPU 61 of the server 11 generates and transmits, to the registered user, electronic mail for checking the use status of his or her credit card or whether or not the credit card is lost, or an operator at the authentication center 1 checks with the registered user as to the use status of his or her credit card or as to whether the credit card is lost, by means of conventional mail or telephone without going through the network 2.

In step S12, the CPU 101 of the client 31 receives the authentication-level determination result from the server 11 via the network 2, the network interface 108, and the internal bus 102.

In step S13, the CPU 101 of the client 31 determines a combination in the personal authentication device 35, based on the authentication-level determination result received in step S12. A table as shown in FIG. 13 is recorded in the client 31. The table indicates how the personal authentication devices 41 to 44 in the personal authentication device 35 in the store 3 are combined for executing an authentication process for each authentication level. The CPU 101 refers to the table to determine a combination in the personal authentication device 35.

Individual stores 3 may have different personal authentication devices 35. Since price ranges of items handled or services offered vary depending on individual stores 3, it would be of no use to provide a high-cost personal authentication device 35 at a store 3 that handles inexpensive items.

Thus, for example, one of the tables as shown in FIGS. 13A to 13D is recorded in each client 31 at the store 3, according to the personal authentication device 35 provided at each store 3.

For example, suppose one store 3 has, as the personal authentication device 35, a device for inputting a message that a signature has been verified (or, a scanner for capturing a signature as an image), a device for inputting a password, a device for obtaining fingerprint information, and a device for obtaining iris information. Thus, as shown in FIG. 13A, when the set authentication level is the lowest level A, the authentication process is executed with only a signature; at level B, the authentication process is performed with a signature and an input password; at level C, the authentication process is performed with a signature and a verified fingerprint; and at level D, the authentication process is performed with a signature, a password, a verified fingerprint, and a verified iris.

Likewise, at another store, as shown in FIG. 13B, when a set authentication level is the lowest level A, the authentication process is performed with only an input password; at level B, the authentication process is performed with an input password and a verified fingerprint; at level C, the authentication process is performed with an input password and a verified voiceprint; and at level D, the authentication process is performed with an input password, a verified fingerprint, and a verified voiceprint. At another store, as shown in FIG. 13C, at level A, the authentication process is performed with a signature and an input password; at level B, the authentication process is performed with a signature and a verified fingerprint; at level C, the authentication process is performed with a signature, a verified fingerprint, and a verified palmprint; and at level D, the authentication process is performed with a signature, a verified fingerprint, identified face information (based on feature information of a captured image of a face), and a verified voiceprint. At yet another store, as shown in FIG. 13D, at level A, the authentication process is performed with a signature; at level B, the authentication process performed with a challenge response and a signature; at level C, the authentication process is performed with a challenge response and a verified fingerprint; and at level D, the authentication process is performed with a challenge response, a verified fingerprint, and a verified palmprint.

In this case, verification with a signature may be performed in such a manner that, for example, a clerk at the store 3 verifies the signature of a user and operates a button or the like for the completion of verification on the personal authentication device 35. Alternatively, image information of the user's signature may be captured into the personal authentication device 35 or features of the user's signature may be captured as information so that such information is transmitted to the server 11 via the client 31 and the network 2.

In the above, the description has been given for a case in which a plurality of authentication methods is combined depending on each authentication level. However, at a store 3 having the same number of personal authentication devices, each having a different authentication accuracy, as the number of authentications levels, a personal authentication device may be selected such that only one personal authentication device that is suitable for each authentication level is used to perform an authentication process. When an employed method for authentication involves asking personal information (e.g., an address or part of a telephone number) registered at the time of user registration or questions that are not so complicated information, such as a birthplace and/or mother's maiden name, but that can only be answered by an authentic person, the number of questions may be changed depending on an authentication level. Additionally, only one authentication process device may be used to allow for a plurality of authentication processes, and the type or number of authentication processes to be executed may be changed according to an authentication level.

In step S14, the CPU 101 of the client 31 generates a message for causing the user at the store 3 to undergo a personal authentication process using the personal authentication device 35 that includes a combination determined in step S13, and outputs the message to the display 33 via the accounting device 32 to prompt the user to input, via the input device 36, information necessary for executing personal authentication of the user. The input user's personal authentication information is subjected to necessary processes (e.g., an image process and a feature extracting process) by the personal authentication device 35 and is then supplied to the client 31.

In step S15, the CPU 101 of the client 31 transmits the user's personal authentication information, which is input from the personal authentication device 35 in step S14, to the server 11 via the internal bus 102, the network interface 108, and the network 2.

In step S16, the CPU 61 of the server 11 receives the user's personal authentication information from the client 31 and executes an authentication process based on the registered user's personal information recorded in the personal-information database 22. In step S17, the CPU 61 transmits the result of the authentication process executed in step S16 to the client 31 via the internal bus 63, the input/output interface 62, the network interface 70, and the network 2.

In step S18, based on the user's information, which is transmitted from the client 31 in step S2, such as a client ID, a purchase amount to be spent by the user, and an item category, the CPU 61 of the server 11 updates the activity-area/time-frame weighting table, purchase-amount weighting table, and item-category weighting table, which are stored in the personal-information database 22.

In step S19, the CPU 101 of the client 31 receives the personal authentication process result from the server 11 via the network 2, the network interface 108, and the internal bus 102. In step S20, based on the received personal authentication process result, the CPU 101 determines whether or not the personal authentication is properly executed.

In step S20, when it is determined that the personal authentication is not properly executed, in step S21, the CPU 101 of the client 31 generates an error message indicating the failure of the authentication process and outputs the error message to the display 33 via the accounting device 32, so that the clerk at the store 3 is notified of, for example, the credit card being suspended from use, thereby ending the process.

In step S20, when it is determined that the personal authentication is properly executed, in step S22, the CPU 101 of the client 31 generates a message for execution of the accounting process and outputs the message to the display 33 via the accounting device 32, so that the clerk at the store 3 is notified that the authentication process for use of the credit card has been properly executed, thereby ending the process.

In the processes described above, the likelihood of whether or not a user at the store 3 is an authentic user who has been registered is determined based on the ordinary activity pattern of the registered user. With this arrangement, when a rightful user undergoes an authentication process in the range of his or her ordinary life, it is possible to prevent an authentication process from being executed at an authentication accuracy more than required and thus to prevent more time from being taken than required, for an accounting process upon purchase of goods or services.

In addition, since the personal activity pattern utilized for determination of an authentication level is sequentially updated according to the use status of a credit card, the present invention can be applied to not only a case in which the activity pattern of a user varies, but can also increase the possibility of preventing damage beforehand even when a third party has already acquired some personal information of the user, since an individual activity pattern that can vary sequentially is difficult for a third party to imitate. Specifically, when an unauthorized person impersonates a registered user to undergo an authentication process, the authentication level becomes high or the possibility that the authentication process itself is disabled becomes high.

Furthermore, a determination is made as to whether high authentication levels continue. When it is determined so, since such an activity is apparently unnatural, the use status of the credit card and the like is confirmed with the registered use by some kind of method. Thus, when the impersonating third party fraudulently uses the credit card, it is possible to prevent extensive damage.

While the description in the above has been given for a case in which a credit card is used at the time of purchase of goods or services, the present invention can also be used for other applications. Examples include issuance of various certificates at a government or municipal office or the like and a personal authentication process executed for a room access control, as well as the use of a cash card or an IC card.

In the illustrated embodiment, the personal information of a registered user is recorded in the storage section 12 in the authentication center 1, and the server 11 determines an authentication level therefor and performs an authentication process based on personal authentication information obtained by the client 31. However, the authentication center 1 may determine only an authentication level, and the client 31 may hold personal information, obtain personal authentication information, and perform an authentication process. Alternatively, only one device may determine an authentication level, obtain personal authentication information, hold personal information, and perform an authentication process without transmitting and receiving information over the network 2. Additionally, for example, an IC card, such as a PKI (public key infrastructure) card, supporting a PKI may be used for the authentication process.

The series of processes described above can also be implemented with software. In such a case, a computer that is implemented with dedicated hardware into which a program that realizes such software is incorporated may be used, or alternatively, such software is installed on a general-purpose personal computer, which can execute various functions by installing various programs, from a recording medium.

As shown in FIGS. 2 and 11, the recording medium is implemented with a packaged medium, on which a program is recorded and which is distributed to a user separately from a compute. Examples of packaged media include the magnetic disks 81 and 111 (including a flexible disk), the optical disks 82 and 112 [including a CD-ROM (Compact Disk-Read Only Memory) and a DVD (Digital Versatile Disk)], the magnetic optical disks 83 and 113 [including an MD (Mini-Disk) (copyright)], and the semiconductor memories 84 and 114.

Herein, steps for writing a program onto a recording medium may or may not be performed according to time series as described above, and may also be performed in parallel or independently.

Herein, the term "system" represents the entirety of the plurality of devices.

What is claimed is:

1. An information processing apparatus comprising:

[a first recording unit configured to record information concerning an activity pattern of a registered user;

a first obtaining unit configured to obtain]

*processing circuitry; and*

*memory storing instructions that when executed by the processing circuitry cause the processing circuitry to perform the steps of*

*generating an activity pattern of a registered user by continuously tracking movement of the registered user for a predetermined period and recording information concerning the tracking,*

*obtaining* information concerning a location at which a user begins an authentication process[;],

[a second obtaining unit configured to obtain] *obtaining* a current time at which the user begins the authentication process[;],

[a determination criterion calculating unit configured to calculate] *calculating* a determination criterion by weighing the information concerning the *generated* activity pattern of the registered user [recorded in the first recording unit] against the *obtained* information concerning the location [obtained by the first obtaining unit] and the *obtained* current time [obtained by the second obtaining unit; and],

[an authentication-level determining unit configured to determine] *determining*, from a plurality of authentication levels, an authentication level to be used in the authentication process based on the determination criterion, each authentication level corresponding to different authentication requirements, *and*

*applying the determined authentication level to the authentication process.*

2. An information processing apparatus according to claim 1, wherein the information concerning the activity pattern is recorded as a table [in the first recording unit], weighting factors being specified in the table so as to correspond to locations and time frames[;], and

*wherein the memory further stores instructions that when executed by the processing circuitry cause the processing circuitry to perform the step of,* based on one of the weighting factors which corresponds to the information concerning the *obtained* location [obtained by the first obtaining unit] and the *obtained* current time [obtained by the second obtaining unit], [the authentication-level determining unit determines] *determining* the authentication level to execute the authentication process for the user.

3. An information processing apparatus according to claim 1, wherein activity patterns that vary depending on a day of a week are registered in the information concerning the *generated* activity pattern [recorded in the first recording unit].

4. An information processing apparatus according to claim 1, [further comprising an updating unit configured] *wherein the memory further stores instructions that when executed by the processing circuitry cause the processing circuitry* to [update] *perform the step of updating* the *generated* activity pattern [recorded in the first recording unit].

5. An information processing apparatus according to claim 1, [further comprising:

a third obtaining unit configured to obtain] *wherein the memory further stores instructions that when executed by the processing circuitry cause the processing circuitry to perform the step of*

*obtaining* information concerning at least one of an item which the user purchases and a service which the user uses[;], and

[a second recording unit configured to record] *recording* a table that is used to determine a weighting factor so as to correspond to the information concerning the at least one of the item and the service, wherein [the authentication-level determining unit further uses] the information concerning the at least one of the item and the service [obtained by the third obtaining unit] and the weighting factor that is determined according to the *recorded* table [recorded by the second recording unit], *is used* to determine the authentication level.

6. An information processing apparatus according to claim 5, [further comprising an updating unit configured to update] *wherein the memory further stores instructions that when executed by the processing circuitry cause the processing circuitry to perform the step of updating* the table [recorded in the second recording unit].

7. An information processing apparatus according to claim 5, wherein the information concerning the at least one of the item and the service includes the information of an amount of money which the user spends for the at least one of the item and the service.

8. An information processing apparatus according to claim 5, wherein the information concerning the at least one of the item and the service includes category information of the at least one of the item and the service.

9. An information processing apparatus according to claim 1, [further comprising a transmitting unit configured to transmit]

*wherein the memory further stores instructions that when executed by the processing circuitry cause the processing circuitry to perform the step of transmitting* information concerning the *determined* authentication level [determined by the authentication-level determining unit] to another information processing apparatus.

10. An information processing method comprising:

*generating, by a server, an activity pattern of a registered user by continuously tracking movement of the registered user for a predetermined period and* recording information *concerning the tracking in memory* in a first recording unit[, the information concerning an activity pattern of a registered user];

obtaining information by [a first obtaining unit] *the server*, the information concerning a location at which a user begins an authentication process;

obtaining a current time by [a second obtaining unit] *the server* at which a user begins the authentication process;

calculating, *by the server,* a determination criterion by weighing the information concerning the activity pattern of the registered user [recorded in the first recording unit] against the *obtained* information concerning the location [obtained by the first obtaining unit] and the *obtained* current time [obtained by the second obtaining unit]; [and]

determining, from a plurality of authentication levels *by the server*, an authentication level to be used in the authentication process based on the determination criterion, each authentication level corresponding to different authentication requirements*; and*

*applying, by the server, the determined authentication level to the authentication process*.

[11. An information processing apparatus connected to a plurality of authentication devices each configured to execute an authentication of a user's personal information comprising:

a first transmitting unit configured to transmit, to an authentication center, information to calculate a determination criterion to determine an authentication level to execute an authentication process for a user;

a first receiving unit configured to receive authentication level information from the authentication center; and a determining unit configured to determine a combination of the plurality of the authentication devices to execute the authentication process, based on the authentication level information received by the first receiving unit.]

[12. An information processing apparatus according to claim 11, further comprising a recording unit configured to record a table that is used by the determining unit to determine the combination of the plurality of the authentication devices to execute the authentication process so that the combination of the plurality of the authentication devices corresponds to the authentication level information received by the first receiving unit.]

[13. An information processing apparatus according to claim 11, wherein the information transmitted from the first transmitting unit includes an identification for identifying a location at which the authentication process is executed.]

[14. An information processing apparatus according to claim 11, wherein the information transmitted from the first transmitting unit includes information of an amount of money which is spent by the user and subjected to the authentication process.]

[15. An information processing apparatus according to claim 11, wherein the information transmitted from the first transmitting unit includes category information of at least one of an item which the user purchases and a service which the user uses.]

[16. An information processing method for an information processing apparatus that uses a plurality of authentication devices each configured to execute an authentication of a user's personal information, the information processing method comprising:

transmitting, to an authentication center, information to calculate a determination criterion to determine an authentication level to execute an authentication process for a user;

receiving authentication level information from the authentication center; and using a combination of the plurality of the authentication devices to execute the authentication process, based on the received authentication level information, each authentication level corresponding to different authentication requirements.]

[17. An information processing apparatus comprising a plurality of authentication devices each configured to execute an authentication of a user's personal information, the information processing apparatus performing an authentication process using a combination of the authentication devices which is determined based on information including at least one of time and a location at which the authentication process is performed.]

[18. An authentication method for an information processing apparatus that uses a plurality of authentication devices each configured to execute an authentication of a user's personal information, the authentication method comprising performing an authentication process by using a combination of the authentication devices which is determined based on information including at least one of time and a location at which the authentication process is performed.]

[19. An information processing apparatus comprising a plurality of authentication devices each configured to execute an authentication of a user's personal information, the information processing apparatus performing an authentication process using a combination of the authentication devices which is determined based on information including at least one of an item being purchased through the authentication process and an amount of money for the item.]

[20. An authentication method for an information processing apparatus that uses a plurality of authentication devices each configured to execute an authentication of a user's personal information, the authentication method comprising performing an authentication process using a combination of the authentication devices which is determined based on information including at least one of an item being purchased through the authentication process and an amount of money for the item.]

* * * * *